UNITED STATES PATENT OFFICE 2,192,127

PROCESS OF PRODUCING FAST DYEINGS

Friedrich Ebel, Mannheim, and Karl Koeberle, Ludwigshafen-on-the-Rhine, Germany, assignors to General Aniline & Film Corporation, a corporation of Delaware No Drawing. Application November 18, 1937, Serial No. 175,255. In Germany November 25, 1936

4 Claims. (Cl. 8—22)

The present invention relates to a process of producing fast dyeings.

We have found that fast dyeings on materials consisting of or containing cellulose or regenerated cellulose are produced by treating the said materials with the solution of a diazo compound having affinity for the goods to be dyed and with the solution of a compound capable of coupling.

A diazo compound has affinity for the goods to be dyed if it has at least one of the following characteristics: A group consisting of three or more condensed nuclei; the grouping

—HN—CO—NH;

two or more carboylamino groups; a group

or

wherein R and R' are aromatic radicals; a structure like diphenyl. Furthermore, the diazo compounds must be soluble, which is the case, for example, if the molecule contains at least one aza nitrogen atom or a quaternary nitrogen atom, or a polyglycolether radical.

The following statement will further illustrate our invention.

Generally speaking, compounds containing at least three condensed nuclei may be used for the purpose of the present process. The affinity for the fiber increases by the adding on of further rings. For this purpose there may be employed especially aminobenzeneacridines, aminopyridinopyrenes, amino - tribenzophenazines and similar higher cyclic compounds. Compounds having several diazo groups may also be used, as for example, tetrazotized diaminodiquinolino-naphthalene or the tetrazo compound of the following diamine:

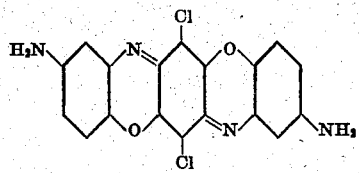

The molecule may also contain other solubilizing groups. For example, the compound

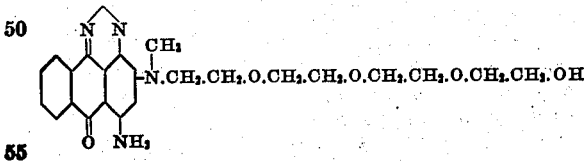

forms a water soluble diazonium salt having affinity for the fiber.

Also, compounds having a structure like diphenyl have a good affinity for the fiber. Already the 4.4'-tetrazonium salt of diphenyl yields satisfactory dyeings. The affinity for the fiber increases with the molecular size. For the most part, however, one of the said water solubilizing groups must be introduced in order to retain the water solubility of the diazo compound. As compounds of this kind there may be mentioned 4.4'-diaminodiazaterphenyl

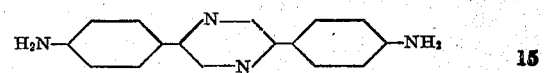

2-(4'-aminophenyl)-quinoline, 1-aza-9-chlor-2-(4'-aminophenyl)-anthracene, 1-aza-2-(4'-aminophenyl)-phenanthrene, 2.4-diamino-9-phenylacridine and other similar compounds.

The same effect as the diphenyl linkage have also linkages between an aromatic ring and an azole ring, e. g. an oxazole, thiazole, imidazole, or triazole ring. A simple compound of this kind is diazotized dehydrothiotoluidine. Higher compounds having even a better affinity for the fiber are, for example, the diazo compounds derived from the following amines:

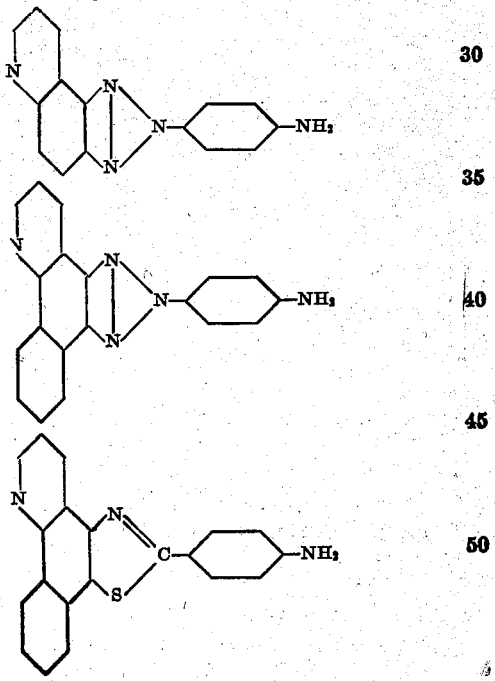

For rendering the amino compounds soluble, instead of the aza nitrogen also one of the other groups as stated above may be present. An example is the compound having the following constitution:

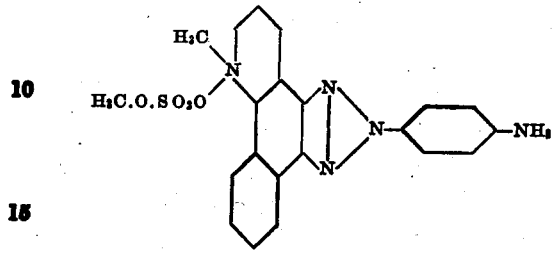

Whereas aminobenzanilide goes onto the fiber only in an insufficient degree, tetrazotized 4.4'-diaminodiphenyl urea having the following constitution:

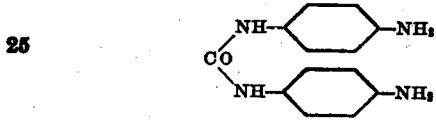

yields fairly strong dyeings. Very powerful dyeings are also obtained by using compounds having several carboylamino groups, as for example

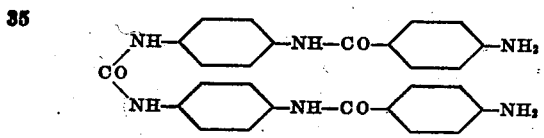

The affinity for the fiber is also increased by the addition of higher radicals, as is the case in the following compounds:

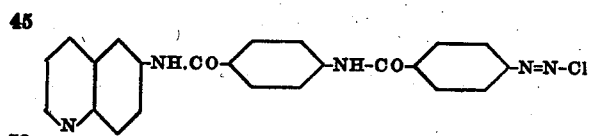

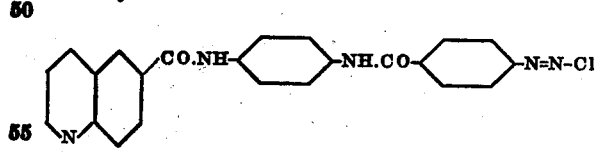

and

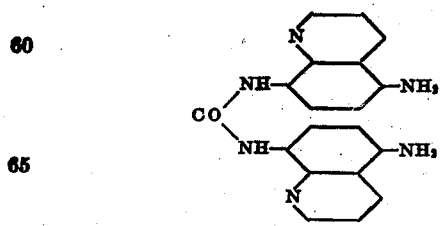

As a changed carboylamino group there may also be mentioned the following group:

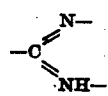

Examples for compounds of this kind are the following:

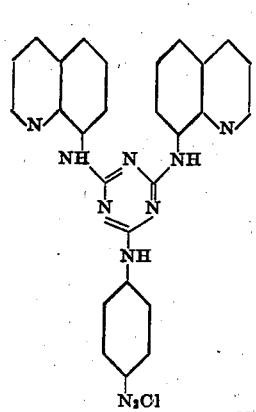 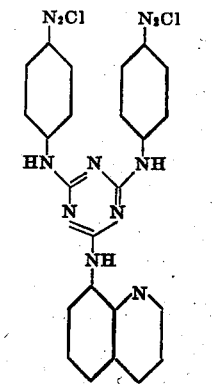

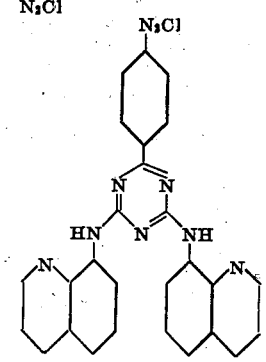

The presence of water solubilizing groups, for example the presence of aza nitrogen atoms, is preferable.

Further groups, producing by their presence affinity for the fiber of diazo compounds, are the azo-, ethylene- and the azeomethine groups. The double linkages of these groups must be in conjugation with aromatic nuclei. For producing satisfactorily powerful and fast dyeings it is indicated to employ compounds which contain besides one of the said groups other characteristics described above or also several groups of the kind mentioned herein. For example, the following compounds may be mentioned:

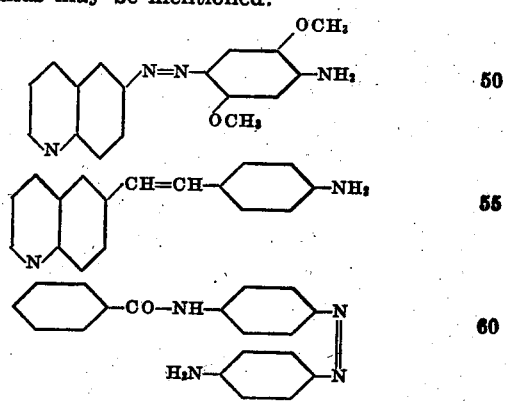

The term "diazo compounds" according to this invention means not only the true diazonium salts, but also their double compounds with metal halides, as for example with zinc chloride, tin chlorides, boron fluoride, and also antidiazotates, nitrosamines, diazosulphonic acids, diazo-anhydrides, diazoamino compounds, provided they are water soluble either as such or in the form of their salts, provided they have affinity for the fibers and provided they are capable of reacting with compounds capable of coupling to form azo dyestuffs, whereby the said reaction may be carried out either directly or in the presence of agents promoting coupling, such as acids, sodium acetate or carbonate, caustic soda solution, pyridine or light.

According to this invention all materials consisting wholly or partly of cellulose or regenerated cellulose may be dyed, as for example woven products from cotton, jute, hemp, flax, coir, viscose artificial silk, copper artificial silk and de-acylated cellulose nitrate or acetate, and also films or other products from the said substances.

The process is carried out by introducing the goods to be dyed at ordinary or slightly elevated temperature into a solution of the diazo compound which may contain wetting agents and/or salts to facilitate the completion of the absorption. After some time, usually at the most after an hour, the goods are removed from the bath, freed as completely as possible from excess of liquid by squeezing, washed and/or dried if desired, and then treated with a solution of a compound capable of coupling. The coupling may be initiated by the agents enumerated above if necessary. The accelerating agents may also be allowed to act first, the compound capable of coupling then being introduced. Similarly it is also possible to apply the diazo compound and the compound capable of coupling to the goods at the same time, the agents promoting coupling then being allowed to act subsequently.

Instead of using a single diazo compound or a single compound capable of coupling, two or more of such compounds may be used in admixture. Furthermore by allowing two or more compounds capable of coupling to act at different times and places, multicolor designs may be produced. For this purpose, for example, there may be printed onto the goods treated with the diazo compound a compound capable of coupling together with a thickening agent and an agent accelerating the coupling in the form of a pattern. The non-printed parts are then developed in a solution of a second coupling compound. There may also be printed on the goods treated with the diazo compound patterns with one or more compounds capable of coupling together with thickening agents, the diazo compound then being removed from the non-printed parts by subsequent washing. Single color and multicolor prints are thus obtained on a white ground.

The said method of dyeing is very simple and protects the goods dyed. All the processes take place in a short time at ordinary temperature in neutral or almost neutral solution. Materials which are especially sensitive, such as mixed fabrics of animal and vegetable fibers or of animal fibers and cellulose hydrate fibers, are therefore suitable for dyeing according to this invention. By reason of the large number of suitable compounds, a great variety of shades of color may be obtained. The fact that even dyeings produced with the aid of compounds having water solubilizing groups have satisfactory fastness to moisture is of special importance. Dyeings without such groups have a specially good fastness to moisture. Therefore, it is possible to dye previously, according to the present invention, the portion of cellulose and/or of cellulose hydrate in mixed fabrics of cellulose and/or cellulose hydrate fibers and then to dye subsequently the portion of other fibers with dyestuffs suitable for these fibers.

The dyeings obtainable according to the present process may be aftertreated in any desired manner. For example, diazotizable dyestuffs may be diazotized on the fiber and reacted with a compound capable of coupling, and vice versa suitable dyestuffs may be coupled on the fiber with diazo compounds, or dyestuffs capable of forming metal complexes, for example such containing a salicylic acid group, may be treated with agents supplying metal. Other dyeings obtainable according to our process may be aftertreated with formaldehyde, and still others with hypochlorites.

The following examples will further illustrate, how our invention may be performed and carried out in practice. The parts are by weight, unless otherwise stated.

The ratio of the parts by weight and the parts by volume is grams to cubic centimeters.

Example 1

1.22 parts of 3-amino-7.8-benzeneacridine

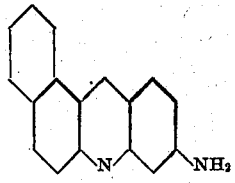

are dissolved in 50 parts by volume of water and 2.25 parts by volume of 10 N hydrochloric acid; the amine is diazotized by the addition of 5 parts of N sodium nitrite solution. Then the diazo solution is diluted with 1160 parts by volume of 10 per cent common salt solution.

In this solution 50 parts of cotton are treated at ordinary temperature for 1 hour, squeezed out well and then introduced into a solution at 25° C. of 1.25 parts of 1-phenyl-3-methylpyrazolone-(5) and 25 parts by volume of 2.5 N sodium acetate solution in 1250 parts of water. After half an hour the dyed cotton is removed from the development bath and soaped with a lukewarm soap solution. Powerful clear yellow dyeings are thus obtained.

If instead of 3-amino-7.8-benzeneacridine the equivalent amount of 2-methyl-3-amino-7.8-benzeneacridine is employed, there are obtained also powerful yellow dyeings. By employing aminobenzenephenazine

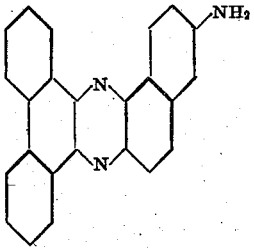

orange-yellow dyeings are obtained.

Example 2

1.8 parts of diamino-diquinolinonaphthalene

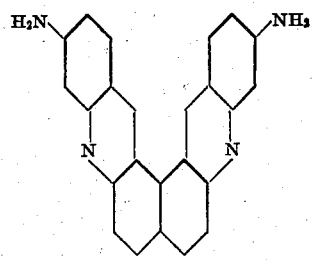

are dissolved in 50 parts of water and 4.5 parts by volume of 10 N hydrochloric acid and the amine is diazotized by the addition of 10 parts by volume of N sodium nitrite solution. Then the solution is diluted with 1750 parts by volume of water.

In this bath 70 parts of cotton are bottomed in the manner described in Example 1. For developing a solution of 2 parts of 1-(4'-sulphophenyl)-3-carboxy-pyrazolone-(5) and 40 parts by volume of 2.5 N sodium acetate solution in 2000 parts by volume of water may be used.

Thus, a very fast yellow dyeing is obtained. Instead of the diazo compound employed there may also be used the diamine of the formula

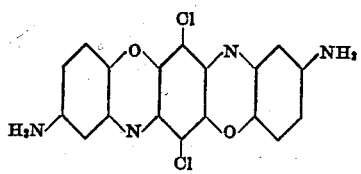

yielding with 2-hydroxynaphthalene in the presence of sodium acetate violet shades.

*Example 3*

1.13 parts of the compound having the following constitution:

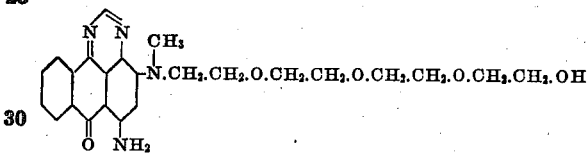

(obtainable from 2-bromo-4-aminoanthrapyrimidine and methylaminoethyltriglycol; brown crystals, melting point at from 328° to 329° C.) are dissolved in 20 parts of water and 1.25 parts by volume of 10 N hydrochloric acid and diazotized with 2.5 parts by volume of N sodium nitrite solution at from 0 to 5° C. Then 40 parts of cotton are bottomed at ordinary temperature for half an hour in the diazo solution diluted with 1100 parts by volume of 10 per cent common salt solution. The fabric is then squeezed out and developed in a bath containing in 1000 parts by volume 1 part of beta-naphthol and 4 parts of sodium acetate. After the development the cotton showing a red coloration is rinsed well with lukewarm water.

*Example 4*

By condensing beta-naphthisatine and p-aminoacetophenone an amino carboxylic acid is obtained which after splitting off the carboxylic group gives an amine having the following constitution:

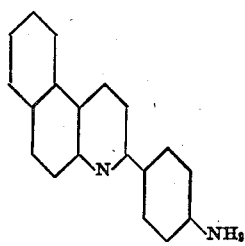

This amine forms yellow crystals which melt at from 217° to 219° C.

1.35 parts of the said amine are dissolved in a small amount of warm glacial acetic acid. Then 2 parts by volume of 10 N hydrochloric acid are added. The solution freezes thus forming a brownish yellow crystal pulp. A solution of 1.1 parts by volume of 5 N sodium nitrite solution is added thereto at from 10° to 15° C. Then the mixture is stirred until all dark orange ingredients have passed into solution and diluted with 1350 parts by weight of water. In the diazo solution thus obtained 50 parts of cotton are bottomed at from 20° to 25° C. for 1 hour. The fabric is then shaken well and introduced for half an hour into a bath containing 1.25 parts of beta-naphthol and 5 parts of sodium acetate in 1250 parts by volume. The cotton gets a powerful red coloration. It is rinsed well and soaped while lukewarm. If other developers are employed instead of beta-naphthol other shades are obtained. For example, with 1-phenyl-3-methyl-pyrazolone-(5) a powerful orange yellow shade is obtained.

Similar results are obtained with the diazo compounds of the following amines:

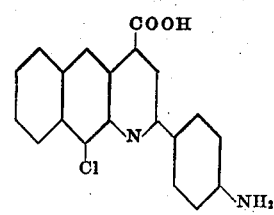

(Prepared from 1-chlor-2(N).3-naphthisatine and p-aminoacetophenone)

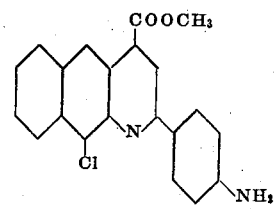

(Esterification of the above compound; brown-yellow crystals melting point at from 228° to 230° C.)

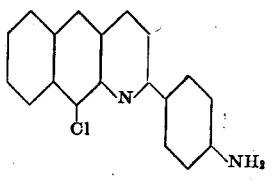

(Obtainable from 1-chlor-2(N).3-naphthisatine and p-aminoacetophenone, then decarboxylated; yellow crystals, melting point at from 218° to 220° C.)

Furthermore there may be employed the amines of 2-(4'-aminophenyl)-quinoline, 2-(4'-aminophenyl)-quinoline-4-carboxylic acid methyl ester, 9-(4'-aminophenyl)-phenanthridine, 4.4'-diaminodiazaterphenyl,

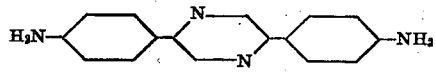

(Prepared from 4-amino-omega-chloracetophenone and ammonia; colorless crystals, melting point at from 187° to 189° C.)

the amine of 4.4'-diaminodiphenyl, 3.4'-diamino-9-phenylacridine

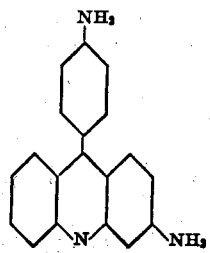

or the amine of 2.7-dimethyl-9-(4'-aminophenyl)-acridine

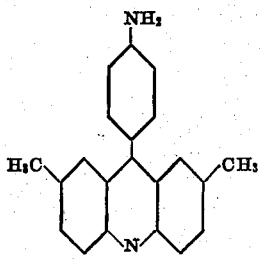

Example 5

1.55 parts of 9.10-(4'-aminophenyltriazolo)-4-azaphenanthrene are dissolved in 20 parts by volume of water and 2 parts by volume of 10 N hydrochloric acid and diazotized at from 5° to 10° C. with 1 part by volume of 5 N sodium nitrite solution. The diazo solution is diluted with 1000 parts by volume of 10 per cent common salt solution. It is employed for the bottoming of 40 parts by viscose artificial silk according to the manner described in the foregoing examples. Then the material is squeezed and the dyeing is developed in a bath containing 1 part of 2-chloracetylamino-5-hydroxynaphthalene-7-sulphonic acid sodium and 4 parts of sodium acetate in 1000 parts by volume. After half an hour, the artificial silk having a powerful red coloration is removed from the development bath, rinsed with lukewarm water and soaped for a quarter of an hour at 40° C. with a solution of 5 grams of Marseille soap in a liter of water.

Instead of chloracetylaminohydroxynaphthalene sulphonic acid other compounds capable of coupling may be employed. The following list describes a number of dyeings thus obtainable:

| Developer | Shade of dyeing | Agent promoting the coupling |
|---|---|---|
| 2-naphthol | Red | Caustic soda solution. |
| 2-ethylaminonaphthalene | do | Sodium acetate. |
| 1.3-diaminobenzene | Brown | Sodium carbonate. |
| 1.3-diamino-4-chlorbenzene | do | Do. |
| 1.3-dihydroxybenzene | do | Caustic soda solution. |
| 1-methyl-2.4-diaminobenzene | do | Sodium carbonate. |
| Phenol | Yellow | Caustic soda solution. |
| 1-ethylaminonaphthalene | Red-brown | Sodium acetate. |
| 2-aminonaphthalene-5-sulphonic acid | Yellow-brown | Do. |
| 2-aminonaphthalene-6-sulphonic acid | do | Do. |
| 1-benzoylamino-8-hydroxynaphthalene-4.6-disulphonic acid | Violet | Sodium carbonate. |
| 1-phenylaminonaphthalene-8-sulphonic acid | Violet-brown | Sodium acetate. |
| 2-amino-8-hydroxynaphthalene-6-sulphonic acid | Brown | Do. |
| 2'.3'-hydroxynaphthoylaniline | Red | Sodium hydroxide. |
| 2'.3'-hydroxynaphthoyl-beta-naphthylamine | do | Do. |
| (Diacetoacetyl)-3.3'-tolidid | Yellow | Do. |

Corresponding results are obtained by using the diazo-compounds of the following amines:

7.8-(4'-aminophenyltriazolo)-4-azaphenanthrene

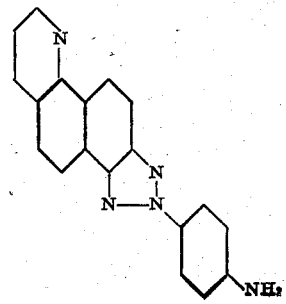

5.6-(4'-aminophenyltriazolo)-quinoline

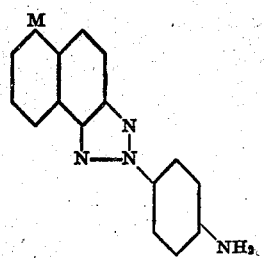

9.10-(4'-aminophenylthiazolo)-4-azaphenanthrene

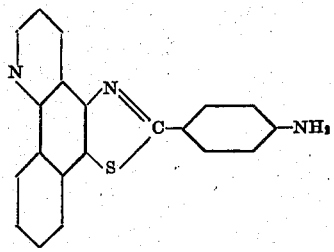

(Prepared by converting 10-amino-4-azaphenanthrene in known manner into 10-amino-9-mercapto-4-azaphenanthrene and then into 9.10-(4'-nitrophenylthiazolo)-4-azaphenanthrene and reduction; yellow crystals, melting point 264° C.)

1-methyl-4.5-(4'-aminophenylthiazolo)-benzene.

Example 6

9.10-(4'-aminophenyltriazolo)-4-azaphenanthrene changes while treating with dimethylsulphate in hot anhydrous nitrobenzene into a quaternary ammonium compound probably having the following constitution:

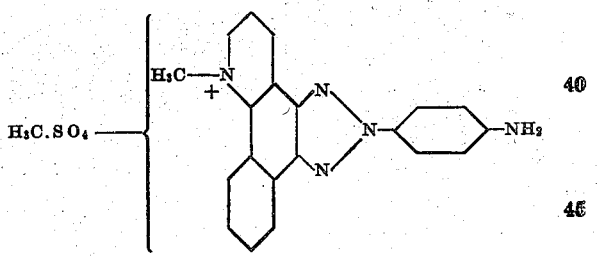

2.2 parts of this compound are dissolved in 2.5 parts by volume of 10 N hydrochloric acid and 50 parts by volume of water. The whole is diazotized by the addition of 5 parts by volume of N sodium nitrite solution. The solution diluted with 2500 parts of water is used for dyeing cellulose fibers according to the manner described in Example 5. If 2-isobutylaminonaphthalene-7-sulphonic acid is employed a powerful clear red coloration is developed.

Example 7

4.4'-diaminodiphenyl urea may be acylated with 2 molecular proportions of 4-nitrobenzoyl chloride. The compound thus formed yields in the reduction a diamine probably having the following formula

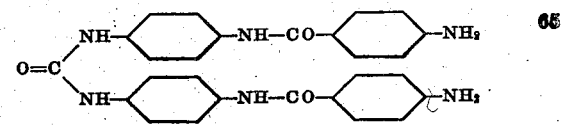

(white microcrystalline powder, melting point >360° C.). In order to be able to diazotize this compound it is dissolved in cold concentrated sulphuric acid and precipitated again by pouring into ice water. Then the compound is freed from sulphuric acid and suspended in water without drying previously. An amount corresponding to 2.4 parts of the said compound in the form of this suspension is then made up with water to form 50 parts by volume, 3 parts by volume of 10 N hydrochloric acid are added and the whole diazotized at between 10° and 15° by the addition of 2 parts by volume of 5 N sodium nitrite solution. After a quarter of an hour the whole has passed into solution. It is then diluted with water to form a total of 2400 parts by volume.

In the diazo solution thus prepared regenerated cellulose is bottomed at from 20° to 25° C. for an hour, squeezed off and developed with the developer solution described in Example 1. Powerful orange-yellow dyeings are thus obtained.

If 4.4'- or 3.3'-diaminodiphenyl urea is employed instead of the described diamine, the dyeings thus obtained are considerably weaker.

Powerful dyeings are obtained with the higher molecular 5.5'-diamino-8.8'-diquinonyl urea:

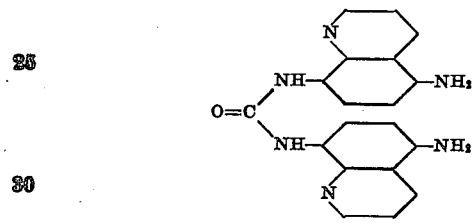

(Prepared from 8-aminoquinoline with phosgene, nitration and reduction of the nitro compound; yellow crystals, melting point at from 237° to 239° C.)

giving on the fiber with beta-naphthol a violet shade.

Other amines of this kind are

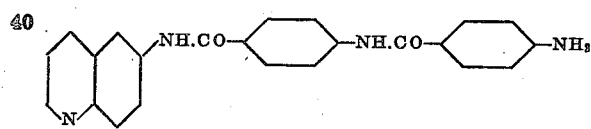

(Obtainable by reaction of 6-aminoquinoline with para-nitrobenzoyl chloride, reduction of the nitro group, second reaction with para nitrobenzoyl chloride and repeated reduction; colorless crystals, melting point 312° C.)

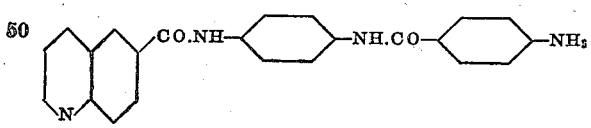

(Obtainable by reaction of quinoline 6-carboxylic acid chloride with para-nitraniline, reduction of the nitro group, reaction of the amine obtained with para-nitrobenzoyl chloride and repeated reduction; colorless needles; melting point 320° C.)

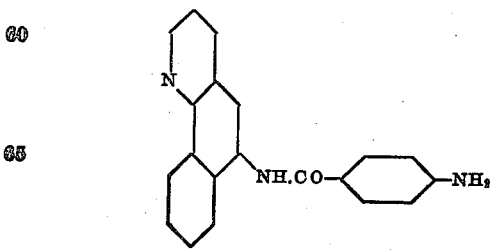

(Prepared from 9-amino-4-azaphenanthrene and para-nitrobenzoyl-chloride, and following reduction of the nitro group; colorless crystals, melting point at from 244° to 245° C.)

By using these amines, clear powerful dyeings are obtained.

Example 8

2 molecular proportions of 8-aminoquinoline are dissolved in ten times its amount of glacial acetic acid and stirred at from 40° to 50° C. after the addition of 1 molecular proportion of cyanuric chloride for 1 hour. The whole passes into solution. Then a yellow crystalline precipitate separates; it is filtered off by suction, washed with glacial acetic acid and water and dried. For the further reaction 10 parts of this compound, 10 parts of para-nitroaniline, 5 parts of anhydrous potassium carbonate and 0.2 part of cuprous carbonate are introduced into 200 parts by volume of anhydrous nitrobenzene. The mixture is then heated at 150° C. for 2 hours. After cooling the precipitate separated is filtered off by suction, washed with methanol and water and dried. Finally, the yellow nitro compound thus formed is still reduced with stannous chloride and hydrochloric acid. A weakly dyed powder is obtained having according to analysis and properties the following formula:

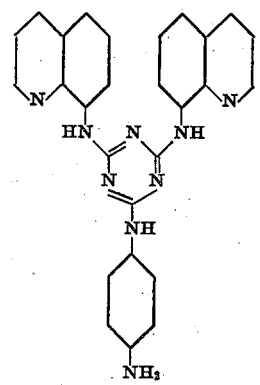

1.57 parts of this amine are dissolved in 45 parts by volume of methanol and 2 parts by volume of 10 N hydrochloric acid. After the addition of 50 parts of water the solution is diazotized with 1 part by volume of 5 N sodium nitrite solution which is added at from 10° to 15° C. at once. Then the diazo solution is diluted with 1450 parts of water.

The dyeing process is carried out according to the prescriptions of the foregoing examples. Powerful and clear shades are obtained.

Instead of the aforesaid amine the amine having the following formula

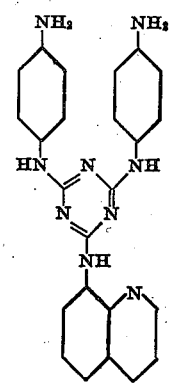

may be employed. It is obtained if the action of the aminoquinoline and para-nitroaniline onto cyanuric chloride is reversed in consideration of the proportions to be changed.

There may also be used the following compound

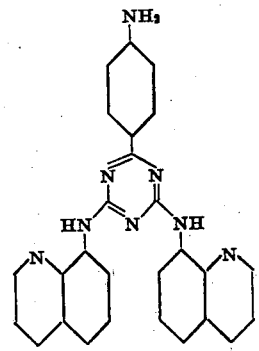

obtainable from 2-(4'-nitrophenyl)-4.6-dichlor-1.3.5-triazine by reaction with 8-aminoquinoline and following reduction.

Example 9

In the usual manner from diazotized 6-aminoquinoline by coupling with aminohydroquinone-dimethyl ether a compound having the following constitution:

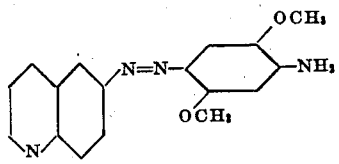

is obtained, the diazonium salt of which goes on cellulose from aqueous solution and may then be developed. For example, beta-ethylnaphthylamine yields red dyeings.

Compounds having similar properties are as follows:

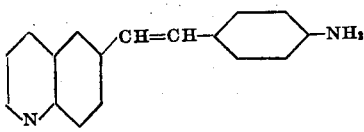

(Obtainable from quinoline-6-aldehyde and p-nitrophenyl acetic acid and reduction of the nitro group)

(Obtainable from 4-nitro-4'-amino-azobenzene and benzoyl chloride and reduction of the nitro group)

Example 10

15.55 parts of 9.10-(4'-aminophenyltriazolo)-4-azaphenanthrene are dissolved in 200 parts of water and 22.5 parts by volume of 10 N hydrochloric acid are diazotized by the addition of 50 parts by volume of N sodium nitrite solution. The yellow solution obtained is diluted with 500 parts of water and mixed with a solution of 20 parts of benzenesulphonic acid sodium in 100 parts by volume of water. After some minutes the 9.10-(4'-diazoniumphenyltriazolo)-4-azaphenanthrene-benzene sulphonate crystallizes in the form of yellow needles. The compound is then filtered off by suction, washed and dried at low temperature. It melts at 145° C. and is stable at ordinary temperature and in the dark at any time.

The benzene sulphonate is not soluble in water, but weakly soluble in dilute cold hydrochloric acid.

10 parts of this benzene sulphonate and 7.5 parts by volume of 10 N hydrochloric acid are dissolved in 3000 parts of water. Then the acid is neutralized with 1 part of sodium acetate. In this bath 120 parts of a fabric of 30 per cent cellulose hydrate and 70 per cent wool are treated at ordinary temperature for an hour. The fabric is squeezed and introduced at ordinary temperature into a bath consisting of:

3 parts of 2-isobutylaminonaphthalene-7-sulphonic acid sodium, 12 parts of sodium acetate, 1.74 parts of anthosine BN (cf. Schultz-Julius, Farbstofftabellen, 7th edition, vol. 1, No. 51), 15 parts of sodium sulphate, 3000 parts of water and 3 parts by volume of 30 per cent acetic acid.

The dye-bath is heated to boiling within half an hour; this temperature is kept for half an hour. Then 3 parts by volume of 30 per cent acetic acid are added and the boiling is continued for half an hour. The dyed fabric is rinsed well with lukewarm water. A powerful red dyeing covering equally both kinds of fibers is thus obtained.

What we claim is:

1. A process of producing fast dyeings on cellulosic material which comprises treating the good to be dyed with the solution of a diazo compound having at least one aza nitrogen and at least three rings, and subsequently with a coupling component.

2. A process of producing fast dyeings on vegetable fibers which comprises treating the good to be dyed with the solution of a diazo compound having at least one aza nitrogen and at least three rings, and subsequently with a coupling component.

3. A process of producing fast dyeings on regenerated cellulose which comprises treating the good to be dyed with the solution of a diazo compound having at least one aza nitrogen and at least three rings, and subsequently with a coupling component.

4. A process of producing fast dyeings on mixtures of regenerated cellulose and animal fibers which comprises treating the good to be dyed with the solution of a diazo compound having at least one aza nitrogen and at least three rings, and subsequently with a coupling component.

FRIEDRICH EBEL.
KARL KOEBERLE.